(12) United States Patent
Sun et al.

(10) Patent No.: US 11,431,430 B2
(45) Date of Patent: Aug. 30, 2022

(54) TECHNIQUES AND APPARATUSES FOR DOWNLINK CONTROL CHANNEL DESIGN USING A TOP TO BOTTOM SEARCH SPACE

(71) Applicant: QUALCOMM Incorporated, San Diego, CA (US)

(72) Inventors: Jing Sun, San Diego, CA (US); Tao Luo, San Diego, CA (US); Tamer Kadous, San Diego, CA (US); Juan Montojo, San Diego, CA (US); Xiao Feng Wang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/711,768

(22) Filed: Dec. 12, 2019

(65) Prior Publication Data

US 2021/0167885 A1    Jun. 3, 2021

Related U.S. Application Data

(62) Division of application No. 15/873,441, filed on Jan. 17, 2018, now Pat. No. 10,511,399.
(Continued)

(51) Int. Cl.
*H04J 11/00* (2006.01)
*H04W 48/12* (2009.01)
(Continued)

(52) U.S. Cl.
CPC ........ *H04J 11/0086* (2013.01); *H04L 5/0053* (2013.01); *H04W 48/12* (2013.01);
(Continued)

(58) Field of Classification Search
None
See application file for complete search history.

(56) References Cited

U.S. PATENT DOCUMENTS

| 8,606,286 B2 | 12/2013 | Vrzic et al. |
| 9,756,623 B2 * | 9/2017 | Seo ..................... H04W 72/04 |

(Continued)

FOREIGN PATENT DOCUMENTS

| CN | 102255688 A | 11/2011 |
| WO | 2010088536 A1 | 8/2010 |

OTHER PUBLICATIONS

International Search Report and Written Opinion—PCT/US2018/021156—ISA/EPO—dated Jun. 15, 2018.
(Continued)

*Primary Examiner* — Anh Ngoc M Nguyen
(74) *Attorney, Agent, or Firm* — Harrity & Harrity, LLP\Qualcomm Incorporated

(57) ABSTRACT

User equipment associated with a legacy network may utilize a bottom-to-top search technique to identify relevant control channel samples. Generating a control channel that is configured for the bottom-to-top search technique may lead to poor performance in a single-carrier waveform, which may be disadvantageous as networks move toward New Radio. In some aspects, described herein, a base station generates a control channel that is configured to minimize gaps in the control channel, and a user equipment performs a top-to-bottom search technique to identify relevant control channel samples. By using the top-to-bottom search technique, degradation of single-carrier waveforms is reduced and efficiency is improved.

32 Claims, 15 Drawing Sheets

Related U.S. Application Data

(60) Provisional application No. 62/483,269, filed on Apr. 7, 2017.

(51) Int. Cl.
  H04L 5/00 (2006.01)
  H04W 72/12 (2009.01)

(52) U.S. Cl.
  CPC .... *H04J 11/0093* (2013.01); *H04J 2011/0096* (2013.01); *H04W 72/1289* (2013.01)

(56) References Cited

U.S. PATENT DOCUMENTS

| | | | |
|---|---|---|---|
| 9,794,913 | B2 | 10/2017 | Lee et al. |
| 10,511,399 | B2 | 12/2019 | Sun et al. |
| 10,925,048 | B2 | 2/2021 | Sun et al. |
| 2010/0303011 | A1* | 12/2010 | Pan ................ H04L 5/0091 370/328 |
| 2013/0142142 | A1* | 6/2013 | McBeath ............ H04W 72/042 370/329 |
| 2014/0036810 | A1 | 2/2014 | Harrison et al. |
| 2015/0172022 | A1* | 6/2015 | Guo ................ H04L 5/0053 370/329 |
| 2016/0020883 | A1 | 1/2016 | Golitschek et al. |
| 2016/0119904 | A1 | 4/2016 | Feng et al. |
| 2016/0278054 | A1 | 9/2016 | You et al. |
| 2019/0029005 | A1 | 1/2019 | Bendlin et al. |

OTHER PUBLICATIONS

LG Electronics: "Discussion on Hierarchical Structure of Search Space," 3GPP Draft; R1-1704904 Discussion on Hierarchical Structure of Search Space Final, 3rd Generation Partnership Project (3GPP), Mobile Competence Centre 650, Route Des Lucioles; F-06921 Sophia-Antipo, vol. RAN WG1, No. Spokane, US; Apr. 3, 2017-Apr. 7, 2017, Apr. 2, 2017, XP051243039, 6 pages, Retrieved from the Internet: URL: http://www.3gpp.org/ftp/Meetings_3GPP_SYNC/RAN1/Docs/ [retrieved on Apr. 2, 2017].

Nokia, et al., "On the PDCCH Search Space Structure for NR," 3GPP Draft; R1-1705227_Search Space_Final, 3rd Generation Partnership Project (3GPP), Mobile Competence Centre; 650, Route Des Lucioles; F-06921 Sophia-Antipolis Cedex; France, vol. Ran WG1, No. Spokane, WA, USA; Apr. 3, 2017-Apr. 7, 2017, Apr. 2, 2017, XP051243358, 5 pages, Retrieved from the Internet: URL: http://www.3gpp.org/ftp/Meetings_3GPP_SYNC/RAN1/Docs/ [retrieved on Apr. 2, 2017].

PDCCH Blocking Probability: "Search Space Design," 3GPP Draft; R1-1705736, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051243851,4 Pages, Retrieved from the Internet URL: http://www.3gpp.org/ftp/Meetings_3GPP_SYNC/RAN1/Docs/ [retrieved on Apr. 2, 2017].

Samsung: "DMRS Design for URLLC," 3GPP Draft; R1-1705382, 3rd Generation Partnership Project (3GPP), Mobile Competence Centre; 650, Route Des Lucioles; F-06921 Sophia-Antipolis Cedex; France, vol. Ran WG1, No. Spokane, USA; Apr. 3, 2017-Apr. 7, 2017, Apr. 2, 2017, XP051243512, 4 pages, Retrieved from the Internet: URL http://www.3gpp.org/ftp/Meetings_3GPP_SYNC/RAN1/Docs/ [retrieved on Apr. 2, 2017].

* cited by examiner

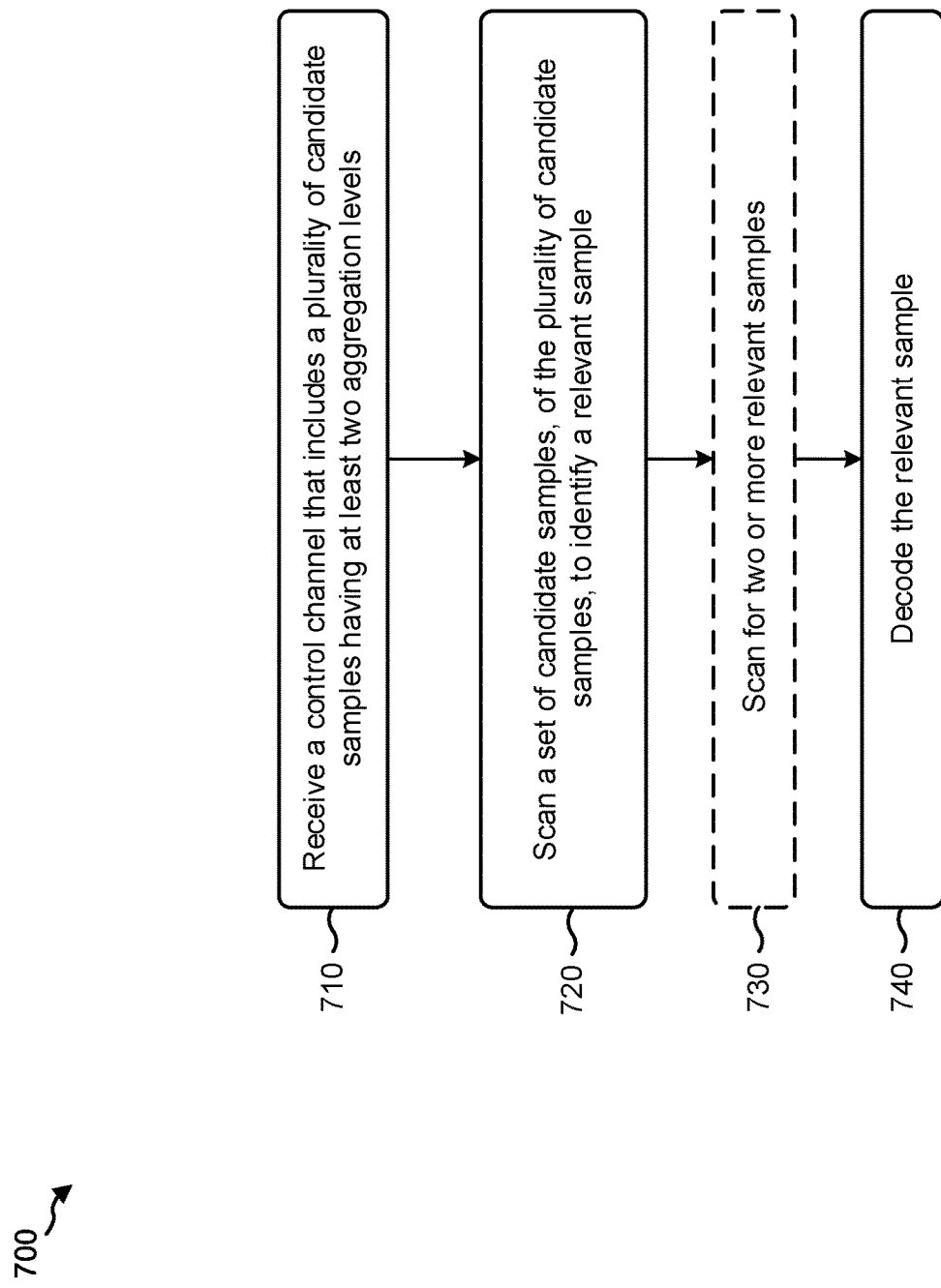

TECHNIQUES AND APPARATUSES FOR DOWNLINK CONTROL CHANNEL DESIGN USING A TOP TO BOTTOM SEARCH SPACE

CROSS-REFERENCE TO RELATED APPLICATIONS UNDER 35 U.S.C. § 119

This application is a divisional of U.S. patent application Ser. No. 15/873,441, filed on Jan. 17, 2018 (now U.S. Pat. No. 10,511,399), entitled "TECHNIQUES AND APPARATUSES FOR DOWNLINK CONTROL CHANNEL DESIGN USING A TOP TO BOTTOM SEARCH SPACE," which claims priority to Provisional Application No. 62/483,269, filed on Apr. 7, 2017, entitled "TECHNIQUES AND APPARATUSES FOR DOWNLINK CONTROL CHANNEL DESIGN USING A TOP TO BOTTOM SEARCH SPACE," which are hereby expressly incorporated by reference herein.

BACKGROUND

Field

Aspects of the present disclosure generally relate to wireless communication, and more particularly to techniques and apparatuses for downlink control channel design using a top to bottom search space.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 3G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 3G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

A BS may convey control information to a UE on a control channel. For example, the control channel may include a physical downlink control channel (PDCCH) and/or the like. In some cases, a BS may provide control information for multiple, different UEs on the PDCCH. For example, the BS may provide a cell that covers a group of UEs, and may provide respective sets of control channel elements (CCEs) for each UE, of the group of UEs, on the PDCCH. A set of CCEs for a particular UE is referred to herein as a control resource set, or coreset. In such a case, each coreset may be encoded using a respective seed (e.g., a random seed) corresponding to each UE. A UE may then search the PDCCH for the coreset that corresponds to the UE, and may decode the coreset based at least in part on the respective seed. For example, a UE may iteratively attempt to decode candidate samples until the UE finds a corresponding candidate sample that includes the coreset.

A UE may search within a respective search space for the corresponding coreset. For example, in a legacy network, such as LTE, the PDCCH may be arranged in a particular fashion, with a common region that all UEs monitor and one or more UE-specific regions that are monitored by corresponding UEs. A UE may blindly search within the common region and a corresponding UE-specific region. For example, the UE may attempt to decode candidate samples until the UE finds a candidate sample that can be successfully decoded by the UE to obtain the corresponding coreset. The above approach may be referred to as a bottom-to-top search technique. The bottom-to-top search technique may work well in LTE networks, but may pose certain problems in 3G/NR networks, especially in a millimeter wave (mmWave) deployment. For example, gaps between coresets (or candidate samples) may be common when a BS generates the PDCCH based at least in part on such a bottom-to-top search technique, which may degrade the single-carrier properties of the 3G/NR carrier signal. Furthermore, in mmWave deployments, a BS may be likely to cover a smaller quantity of UEs than in a legacy network, so the bottom-to-top search technique may be inefficient in such situations, in addition to causing detriment to the single-carrier properties of the 3G/NR carrier signal.

SUMMARY

Techniques and apparatuses, described herein, enable generation of a PDCCH to minimize gaps in the PDCCH, and enable a UE to search for relevant control information based at least in part on a top-to-bottom search space. For example, when a BS covers a single UE, the BS may generate a candidate sample or coreset for the UE that occupies an entirety of a PDCCH provided by the BS. The UE may perform the blind search in a top-to-bottom fashion (e.g., searching for a candidate sample spanning the entirety of the PDCCH, then searching for candidate samples on subsets of the PDCCH). Thus, the BS avoids degradation of the single-carrier waveform due to gaps between candidate samples when serving a single UE. This may be particularly useful for mmWave, since mmWave BSs are more likely to cover a single UE than other types of BSs. Furthermore, techniques and apparatuses described herein enable provision of control information for multiple UEs using a PDCCH that is generated to minimize gaps and that is searchable using the top-to-bottom search space, which improves efficiency and reduces degradation of the single-carrier waveform for the multiple UEs.

In an aspect of the disclosure, a method, an apparatus, a base station, and a computer program product are provided.

In some aspects, the method may include receiving, by user equipment (UE), a control channel that includes a plurality of candidate samples having at least two aggregation levels; scanning, by the UE, a set of candidate samples, of the plurality of candidate samples, to identify a relevant sample associated with the UE, wherein the scanning is performed on the set of candidate samples in an order from a higher aggregation level of the at least two aggregation levels to a lower aggregation level of the at least two aggregation levels; and decoding, by the UE, the relevant sample.

In some aspects, the apparatus may include a memory and at least one processor coupled to the memory. The at least one processor may be configured to receive a control channel that includes a plurality of candidate samples having at least two aggregation levels; scan a set of candidate samples, of the plurality of candidate samples, to identify a relevant sample associated with the apparatus, wherein the scanning is performed on the set of candidate samples in an order from a higher aggregation level of the at least two aggregation levels to a lower aggregation level of the at least two aggregation levels; and decode the relevant sample.

In some aspects, the apparatus may include means for receiving a control channel that includes a plurality of candidate samples having at least two aggregation levels; means for scanning a set of candidate samples, of the plurality of candidate samples, to identify a relevant sample associated with the apparatus, wherein the scanning is performed on the set of candidate samples in an order from a higher aggregation level of the at least two aggregation levels to a lower aggregation level of the at least two aggregation levels; and means for decoding the relevant sample.

In some aspects, the computer program product may include a non-transitory computer-readable medium storing computer executable code. The code may include code for receiving a control channel that includes a plurality of candidate samples having at least two aggregation levels; code for scanning a set of candidate samples, of the plurality of candidate samples, to identify a relevant sample associated with the device, wherein the scanning is performed on the set of candidate samples in an order from a higher aggregation level of the at least two aggregation levels to a lower aggregation level of the at least two aggregation levels; and code for decoding the relevant sample.

In some aspects, the method may include generating, by a base station, at least one control signal for at least one UE for transmission in a control channel, wherein the control channel is associated with a plurality of aggregation levels; selecting, by the base station, at least one aggregation level, of the plurality of aggregation levels, for the at least one control signal to minimize gaps in the control channel; and providing, by the base station, the control channel including at least one sample corresponding to the at least one control signal.

In some aspects, the apparatus may include a memory and at least one processor coupled to the memory. The at least one processor may be configured to generate at least one control signal for at least one UE for transmission in a control channel, wherein the control channel is associated with a plurality of aggregation levels; select at least one aggregation level, of the plurality of aggregation levels, for the at least one control signal to minimize gaps in the control channel; and provide the control channel including at least one sample corresponding to the at least one control signal.

In some aspects, the apparatus may include means for generating at least one control signal for at least one UE for transmission in a control channel, wherein the control channel is associated with a plurality of aggregation levels; means for selecting at least one aggregation level, of the plurality of aggregation levels, for the at least one control signal to minimize gaps in the control channel; and means for providing the control channel including at least one sample corresponding to the at least one control signal.

In some aspects, the computer program product may include a non-transitory computer-readable medium storing computer executable code. The code may include code for generating, by a base station, at least one control signal for at least one UE for transmission in a control channel, wherein the control channel is associated with a plurality of aggregation levels; selecting, by the base station, at least one aggregation level, of the plurality of aggregation levels, for the at least one control signal to minimize gaps in the control channel; and providing, by the base station, the control channel including at least one sample corresponding to the at least one control signal.

Aspects generally include a method, apparatus, device, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 7 is a flow chart of a method of wireless communication.

DETAILED DESCRIPTION

Figure 1:
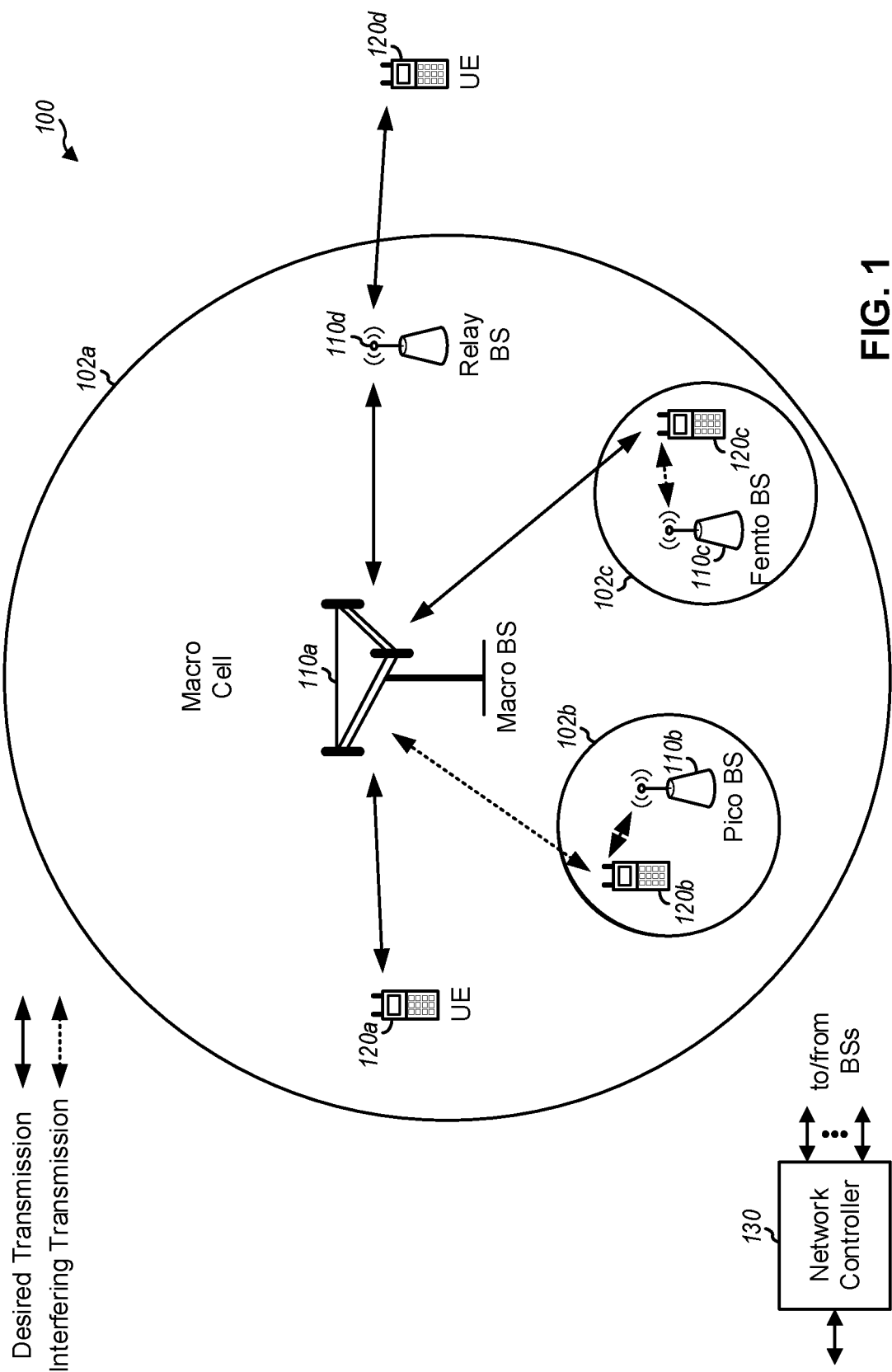
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller (RNC), an eNodeB (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 3G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 3G and later, including NR technologies.

FIG. 1 is a diagram illustrating a network 100 in which aspects of the present disclosure may be practiced. The network 100 may be an LTE network or some other wireless network, such as a 3G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 3G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 3 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 3G RAT networks may be deployed. In such a case, NR or 3G RATs may use single-carrier waveforms (e.g., SC-FDM) and/or in a mmWave band.

In some examples, access to the air interface may be scheduled, wherein a scheduling entity (e.g., a base station) allocates resources for communication among some or all devices and equipment within the scheduling entity's service area or cell (e.g., using a PDCCH). For example, the scheduling entity may identify a device or equipment, within the scheduling entity's service area or cell, to receive a scheduling grant, may generate a control channel to provide the scheduling grant, wherein the scheduling grant is encoded into a relevant sample associated with a particular aggregation level of a plurality of aggregation levels, and may provide the control channel including the relevant sample.

Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
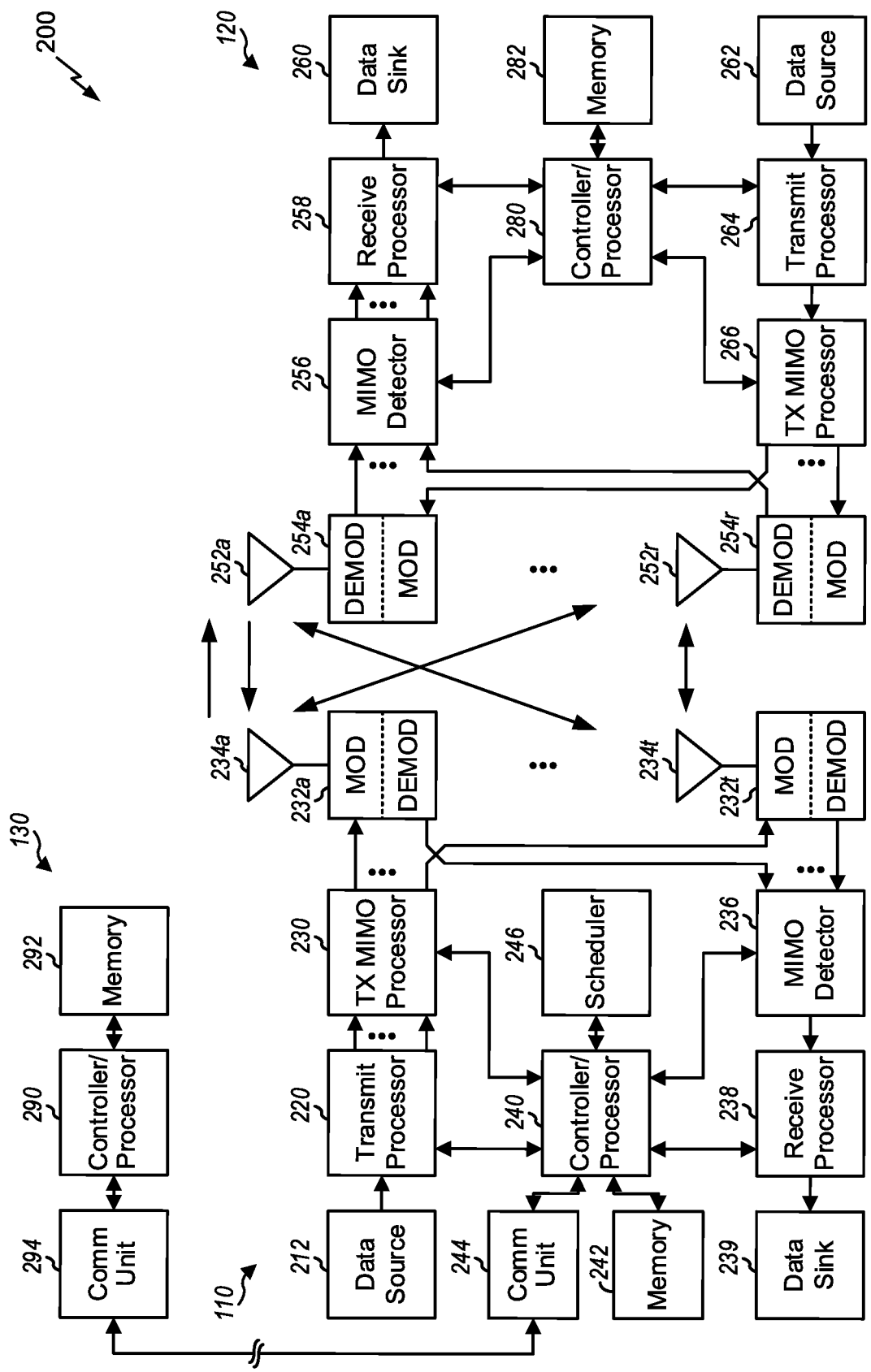
FIG. 2 is a diagram illustrating an example of a base station in communication with a UE in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. In some aspects, the transmit processor 220 and/or modulator 232 may communicate according to DFT-s-OFDM. In such a case, the transmit processor 220 and/or modulator 232 may add a DFT spreading step before tone mapping of the frequency domain samples to output samples.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform downlink control channel design using a top-to-bottom search space. For example, controller/processor 280 and/or other processors and modules at BS 110, may perform or direct operations of UE 120 to perform downlink control channel design using a top-to-bottom search space. For example, controller/processor 280 and/or other controllers/processors and modules at BS 110 may perform or direct operations of, for example, method 900 of FIG. 9, method 1200 of FIG. 12, and/or other processes as described herein. In some aspects, one or more of the components shown in FIG. 2 may be employed to perform example method 900 of FIG. 9, method 1200 of FIG. 12, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
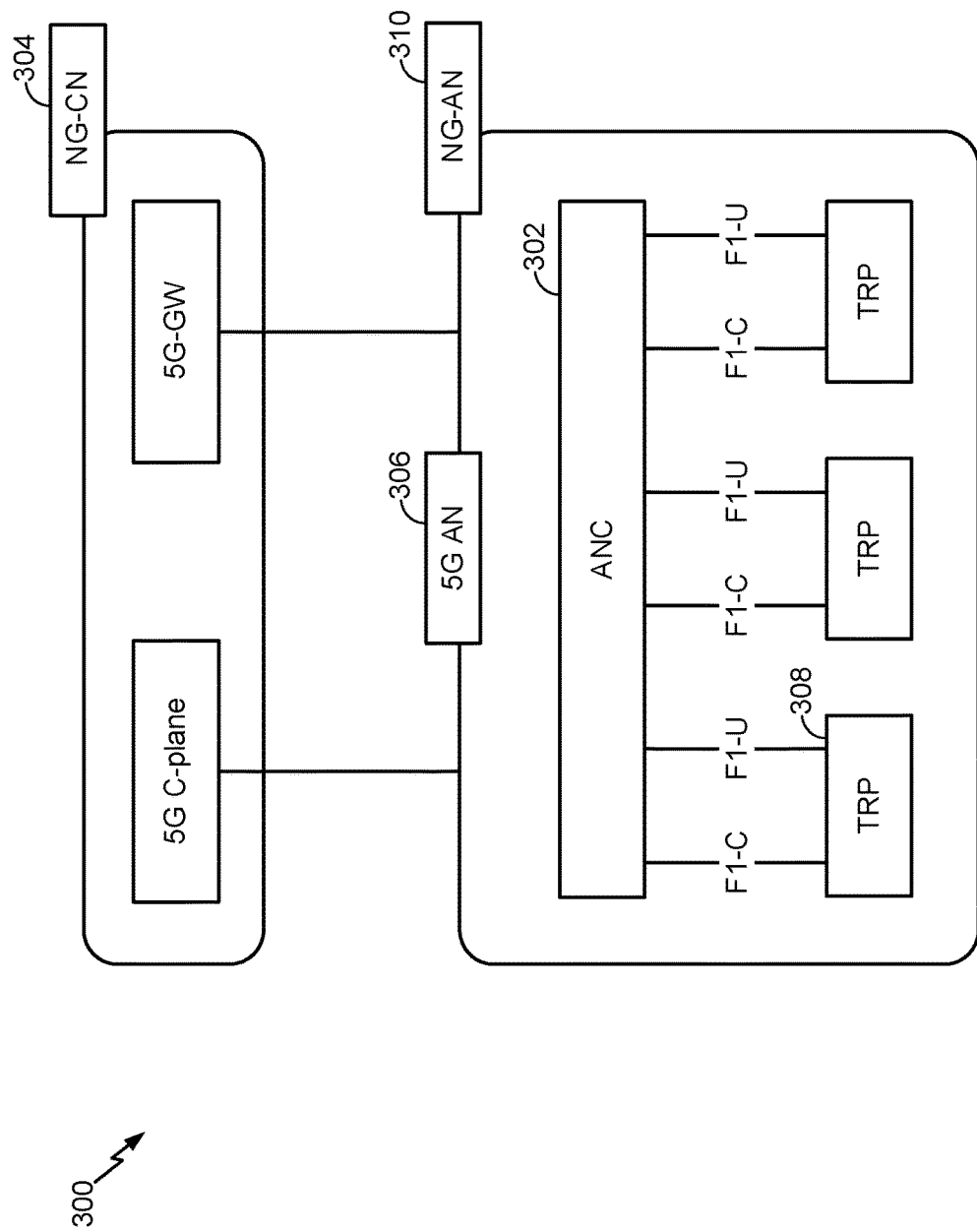
FIG. 3 is a diagram illustrating an example logical architecture of a distributed radio access network (RAN).

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC or TRP.

According to certain aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
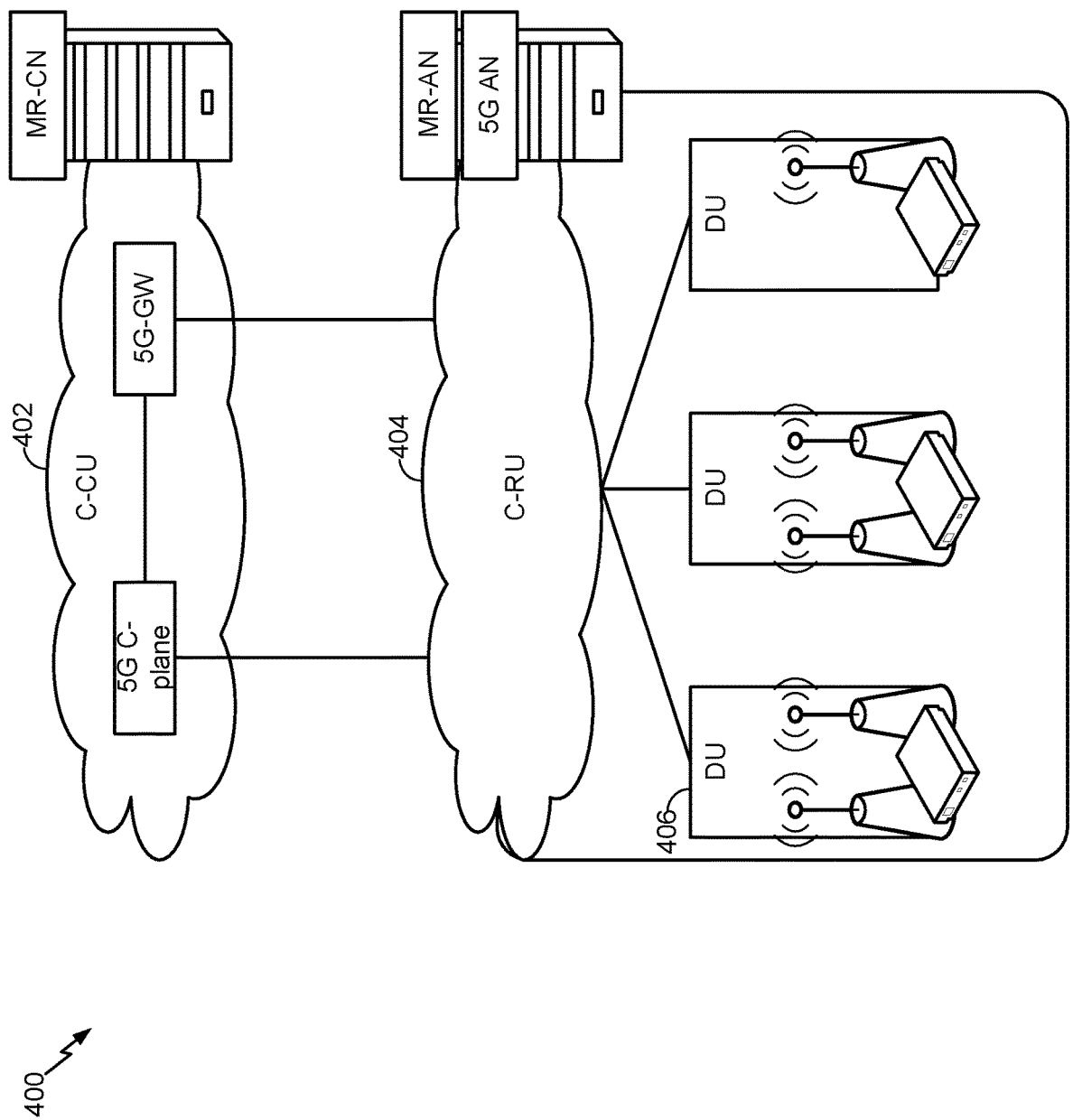
FIG. 4 is a diagram illustrating an example physical architecture of a distributed RAN.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples are possible and may differ from what was described with regard to FIG. 4.

A BS may convey control information to a UE on a control channel. For example, the control channel may include a physical downlink control channel (PDCCH) and/or the like. The PDCCH may include a plurality of resource elements (REs) that are grouped into resource element groups (REGs). A plurality of REGs may collectively be referred to as a control channel element (CCE). One or more CCEs may be allocated for a UE, and control information for the UE may be encoded on the one or more CCEs. The group of one or more CCEs allocated to the UE may be referred to as a coreset of the UE.

As one example, the control information may be provided on a single CCE when the control information can be provided using a single CCE, and additional CCEs may be allocated to the UE when the control information exceeds the size of a single CCE. A single CCE, and a set of CCEs, may be associated with respective aggregation levels. For example, the single CCE may have a lowest aggregation level, and in some aspects, a REG may contain 12 contiguous REs (e.g., twelve frequency tones of a single symbol), and a CCE may contain a fixed quantity of REGs. The REGs and/or the CCEs may be distributed or localized in time (e.g., over OFDM symbols) and/or frequency (e.g., over multiple resource blocks (RBs)).

In some cases, a BS may provide control information for multiple, different UEs on the PDCCH. For example, the BS may provide a cell that covers a group of UEs, and may provide respective coresets for each UE, of the group of UEs, on the PDCCH. In such a case, each coreset may be encoded using a respective seed (e.g., a random seed) corresponding to each UE. A UE may then search the PDCCH for a coreset that corresponds to the UE, and may decode the corresponding coreset based at least in part on the respective seed. A UE may search within a respective search space for a candidate sample including the corresponding coreset. For example, in a legacy network, such as LTE, the PDCCH may be arranged in a particular fashion, with a common region that all UEs monitor and one or more UE-specific regions that are monitored by corresponding UEs. A UE may perform a blind search within the common region and a UE-specific region corresponding to the UE. For example, the UE may attempt to decode candidate samples at a first, lower aggregation level (e.g., associated with one CCE per coreset), until the UE finds a candidate sample that can be successfully decoded by the UE to obtain a coreset for the UE. If the UE cannot find a decodable candidate sample at the lower aggregation level, the UE may proceed to a second, higher aggregation level (e.g., associated with two CCEs per coreset), and may continue the search.

The above approach may be referred to as a bottom-to-top search technique. The bottom-to-top search technique may work well in LTE networks, in which the BS encodes the PDCCH based on the bottom-to-top approach, but may pose certain problems in 3G/NR networks, especially in a millimeter wave (mmWave) deployment, with the use of time-domain-based waveforms such as DFT-S-OFDM. For example, gaps between candidate samples or coresets may occur when using such a bottom-to-top search technique (e.g., when no control information is to be encoded on a particular symbol, the particular symbol may be a gap between encoded symbols). This may degrade the single-carrier properties of the 3G/NR carrier signal due to the higher peak to average power ratio (PAPR) that occurs due to the gaps. Furthermore, in mmWave deployments, a BS may be likely to simultaneously transmit to a smaller quantity of UEs than in a legacy network, so the bottom-to-top search technique may be inefficient in such situations, in addition to causing detriment to the single-carrier properties of the 3G/NR carrier signal.

Techniques and apparatuses, described herein, provide generation of a PDCCH to minimize gaps in the PDCCH, and provide searching of the PDCCH based at least in part on a top-to-bottom search space. For example, when a BS transmits to a single UE, the BS may transmit PDCCH on a candidate sample in the coreset for the UE that occupies an entirety of the coreset (e.g., at a highest aggregation level). The UE may perform the blind search in a top-to-bottom fashion (e.g., searching for a candidate sample on the highest aggregation level spanning the entirety of the coreset, then searching for candidate samples on subsets of the coreset at lower aggregation levels). Thus, the BS avoids degradation of the single-carrier waveform due to gaps between candidate samples when serving a single UE. This may be particularly useful for mmWave, since mmWave BSs are more likely to transmit to a single UE at a given time than other types of BSs. Furthermore, techniques and apparatuses described herein enable generation of a PDCCH to minimize gaps in the PDCCH for control information for multiple UEs using the top-to-bottom search space, which improves efficiency and reduces degradation of the single-carrier waveform for the multiple UEs.

Figure 5:
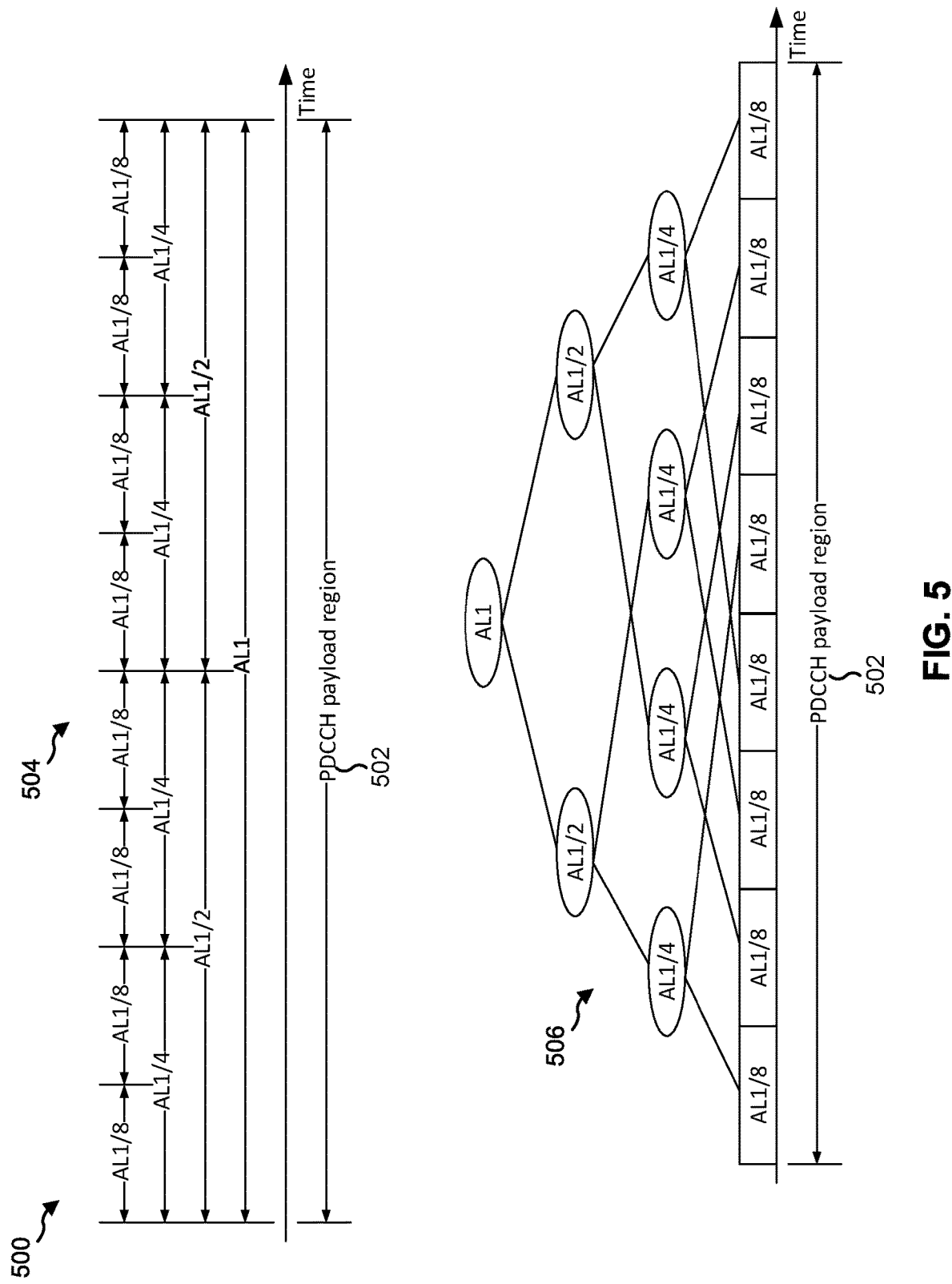
FIG. 5 is a diagram illustrating an example of a top-to-bottom search space for control resource sets in New Radio.

FIG. 5 is a diagram illustrating an example 500 of a top-to-bottom search space for control resource sets in New Radio. For example, FIG. 5 shows an example of how a PDCCH payload region 502 can be divided into candidate samples of various aggregation levels (ALs). For example, the PDCCH payload region may include an OFDM symbol of a control region of a subframe, and REs, REGs, and CCEs of the OFDM symbol may be mapped to one or more UEs 120 that are to receive downlink control information (DCI) as part of the PDCCH payload region 502. In aspects described herein, a BS may select ALs for control signals so that gaps in the PDCCH payload region are minimized or reduced as compared to in LTE and/or using a bottom-to-top approach. For a description of how a UE might scan or perform a search of the search space, refer to FIGS. 6A-6D, below.

As shown by reference number 504, in some aspects, the candidate samples at different ALs may be determined based at least in part on localized splitting. For example, and as shown, a candidate sample associated with AL1 may span an entirety of the coreset or PDCCH payload region 502, and candidate samples associated with AL1/2 (e.g., a lower AL than AL1) may each span half of the coreset or PDCCH payload region 502. As further shown, pairs of candidate samples associated with AL1/4 (e.g., a lower AL than AL1/2) may be formed from portions of the PDCCH payload region 502 associated with the candidate samples associated with AL1/2. Localized splitting may be simpler to implement than distributed splitting, but may reduce time diversity of the candidate samples. While the ALs shown in the localized splitting aspect of FIG. 5 are shown with AL1/8 at the top, a UE 120 that is performing a blind search of the PDCCH payload region may begin at AL1, and may move to decreasing AL levels if decoding of the candidate sample at AL1 is unsuccessful. In other words, the top-to-bottom direction shown in FIG. 5 is not intended to indicate a search space direction of the UE 120.

As shown by reference number 506, in some aspects, the candidate samples at different ALs may be determined based at least in part on distributed splitting. For example, and as shown, each candidate sample at AL1/2 may correspond to two non-adjacent candidate samples at AL1/4. As further shown, each candidate sample at AL1/4 may correspond to two non-adjacent candidate samples at AL 1/8. The distributed splitting approach may provide increased time diversity of the DCI as compared to the localized splitting approach.

While the candidate samples in FIG. 5 are shown with an n^2 splitting ratio and ALs of 1, 1/2, 1/4, and 1/8, a different splitting ratio may be used. For example, an n^3 splitting ratio (with ALs of 1, 1/3, 1/9, 1/27, and so on), or any other splitting ratio may be used.

In some aspects, the candidate samples may have different quantities of resource elements. For example, based at least in part on a quantity of resources in a coreset, a uniform split (e.g., a two-way split, a three-way split, and/or the like) may not be possible. In such a case, some rounding may be needed. For example, a candidate sample having 45 resource elements may be divided, at a lower aggregation level, into two candidate samples having 23 resource elements and 22 resource elements.

As indicated above, FIG. 5 is provided as an example. Other examples are possible and may differ from what was described with respect to FIG. 5.

FIGS. 6A-6D are diagrams illustrating examples 600 of providing downlink control information to one or more UEs using a top-to-bottom search space.

Figure 6A:
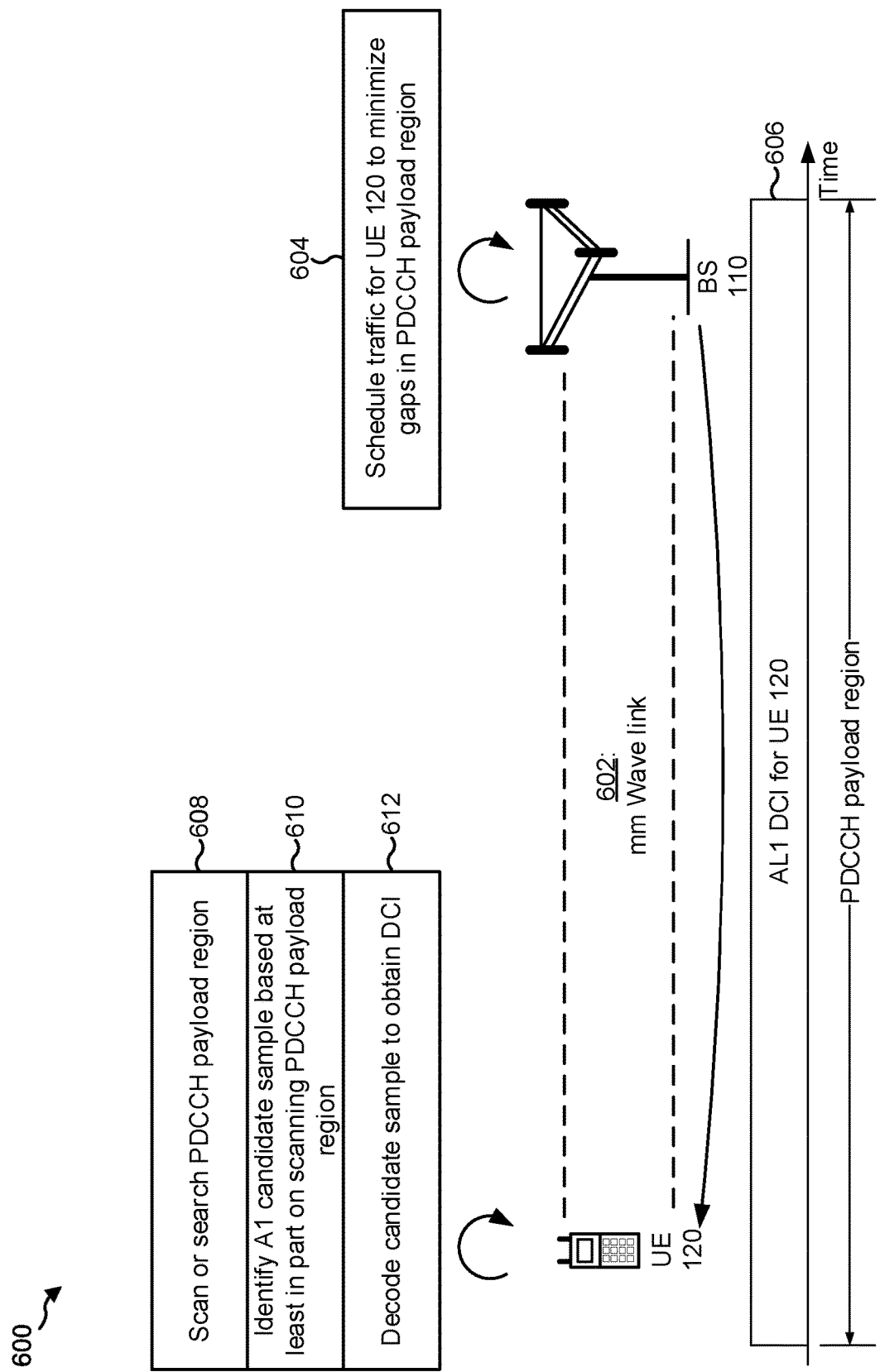
FIGS. 6A-6D are diagrams illustrating examples of providing downlink control information to one or more UEs using a top-to-bottom search space.

As shown in FIG. 6A, and by reference number 602, a BS 110 may communicate with a UE 120 via a mmWave link. For example, the BS 110 may transmit downlink traffic to the UE 120 and/or receive uplink traffic from the UE 120 on the mmWave link. Aspects of the present disclosure may be particularly useful for mmWave communication between BS 110 and UE 120 because BS 110 may cover fewer UEs 120 when using mmWave than when using other radio access technologies. For example, due to the beamformed signal and/or decreased coverage range of mmWave, the BS 110 may cover one UE 120, two UEs 120, three UEs 120, and/or the like. This, in turn, may allow the BS 110 to use an entirety of the PDCCH control region for a single UE 120, or to reduce a quantity of different UEs 120 for which control signaling is provided, thereby preserving the single-carrier properties of the mmWave signal.

As shown by reference number 604, the BS 110 may determine to schedule traffic for the covered UE (e.g., UE 120) to minimize gaps in the PDCCH payload region. For example, the BS 110 may provide DCI on a PDCCH payload region (e.g., or a PDCCH control region). The BS 110 may select a particular aggregation level for the DCI to minimize the gaps, as described below.

As shown by reference number 606, to minimize gaps in the PDCCH payload region, the BS 110 may provide the DCI to the UE 120 on an AL1 candidate sample. For example, the AL1 candidate sample may span an entirety of the PDCCH payload region. The BS 110 may provide the DCI on the AL1 candidate sample since UE 120 is the only UE covered by the BS 110, and since providing the DCI on the AL1 candidate sample will occupy the entire PDCCH payload region, thereby eliminating gaps. In this way, the BS 110 reduces gaps, and, therefore, PAPR of the downlink signal, which preserves the single-carrier properties of the downlink signal, thereby simplifying amplification and improving throughput in the network.

As shown by reference number 608, the UE 120 may scan the PDCCH payload region to identify the DCI (or a relevant sample). For example, the UE 120 may perform a blind search of the PDCCH payload region, starting at a highest aggregation level (e.g., AL1), to identify a relevant sample that includes the DCI.

In some aspects, the UE 120 may start scanning or searching at a lower aggregation level than the highest aggregation level. For example, when the UE 120 is to receive multiple, different DCIs corresponding to multiple, different control signals, the UE 120 may start scanning at AL1/2 or a lower AL (as described in connection with FIGS. 6B and 6D, below. Additionally, or alternatively, it is possible that the UE 120 may not need all resources of the PDCCH payload region. In such a case, a search space of the UE 120 can begin at a lower aggregation level (e.g., AL1/4, if AL1/4 contains sufficient resources for the DCI), which is configured by the base station. In such a case, in some aspects, the BS 110 may frontload the DCI in the PDCCH payload region, and may leave a remainder of the PDCCH payload region empty, may fill the remainder of the PDCCH payload region with padding bits, or may use the remainder of the PDCCH as a downlink shared channel, or to transmit PDCCH to another UE.

As shown by reference number 610, the UE 120 may identify the A1 candidate sample based at least in part on scanning the PDCCH payload region. For example, the UE 120 may attempt to decode a prefix of the A1 candidate sample based at least in part on a seed associated with the UE 120, and may successfully decode the prefix. Thus, the UE 120 may determine that the A1 candidate sample is associated with the UE 120.

As shown by reference number 612, the UE 120 may decode the AL1 candidate sample to obtain the DCI associated with UE 120. In this way, the BS 110 provides DCI using a candidate sample that spans an entirety of the PDCCH payload region, which reduces PAPR of the downlink signal and improves amplifier accuracy. Further, the UE 120 begins searching or scanning at the highest aggregation level (e.g., the aggregation level of the candidate sample that spans the entirety of the PDCCH payload region) which conserves resources of the UE 120 that would otherwise be used to start searching or scanning at a lower aggregation level (e.g., using a bottom-to-top approach).

Figure 6B:
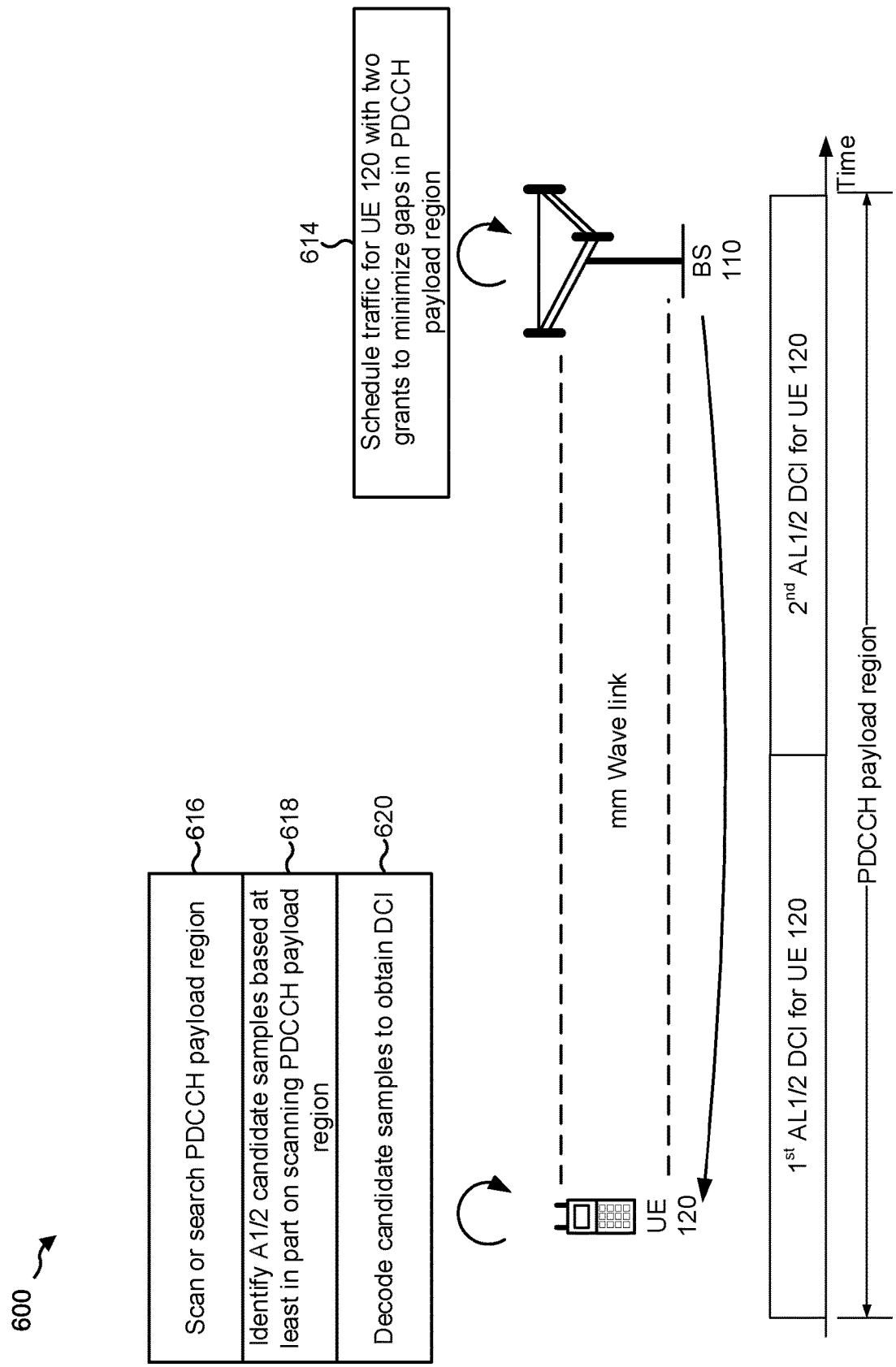

As shown in FIG. 6B, and by reference number 614, the BS 110 may determine to schedule traffic for UE 120 with two grants to minimize gaps in the PDCCH payload region. To schedule the traffic, the BS 110 may provide a first DCI and a second DCI to the UE 120. In such a case, the BS 110 may select a lower AL than the highest AL (e.g., AL1). For example, and as shown, the BS 110 may use a respective AL1/2 coreset for each of the first DCI and the second DCI. BS 110 may use the AL1/2 coreset so that an entirety of the PDCCH payload region is occupied by the first DCI and the second DCI, thereby reducing gaps in the PDCCH payload region.

As shown by reference number 616, the UE 120 may scan the PDCCH payload region to identify the first DCI and the second DCI. In some aspects, the UE 120 may start by scanning or searching at a highest aggregation level (e.g., AL1), and may proceed to scan at AL1/2 when decoding of the candidate sample at AL1 is unsuccessful. Additionally, or alternatively, the UE 120 may be configured to start scanning at AL1/2 (e.g., based at least in part on RRC signaling between the BS 110 and the UE 120), and may identify a first candidate sample and a second candidate sample at AL1/2. In this way, the PDCCH payload region may include multiple coresets of a highest AL that a UE 120 is configured to search. This may permit the BS 110 to handle multiple grants with regard to a single UE 120. In such a case, it is possible that there may be no other UE 120 to share the PDCCH payload region with the UE 120 and, in such a case, the PDCCH payload region may not be fully occupied. This may lead to degradation of PAPR. However, such a degradation may be balanced against the benefit to be gained by providing first and second DCI as part of a single PDCCH payload region.

In some aspects, the BS 110 may provide a DCI at a lower AL based at least in part on a location of a UE 120 relative to the BS 110. For example, when a signal path to the UE 120 is longer, the BS 110 may provide the DCI at a higher AL, and when the signal path to the UE 120 is shorter, the BS 110 may provide the DCI at a lower AL. By providing the DCI at a higher AL, the BS 110 may provide additional redundancy or may use a lower modulation and coding scheme, which may improve likelihood of successful decoding by the UE 120. By providing the DCI at a lower AL, the BS 110 may reduce an amount of resources required to provide the DCI.

As shown by reference number 618, and as described in more detail in connection with FIG. 6A, above, the UE 120 may identify relevant samples including the first DCI and the second DCI based at least in part on scanning the PDCCH payload region. As shown by reference number 620, and as also described in more detail in connection with FIG. 6A, the UE 120 may decode the relevant samples to obtain the first DCI and the second DCI. Thus, the UE 120 obtains two DCIs using a top-to-bottom search space, which reduces PAPR of the downlink signal and conserves resources of the UE 120 that would otherwise be used to perform a bottom-to-top search of the PDCCH payload region.

Figure 6C:
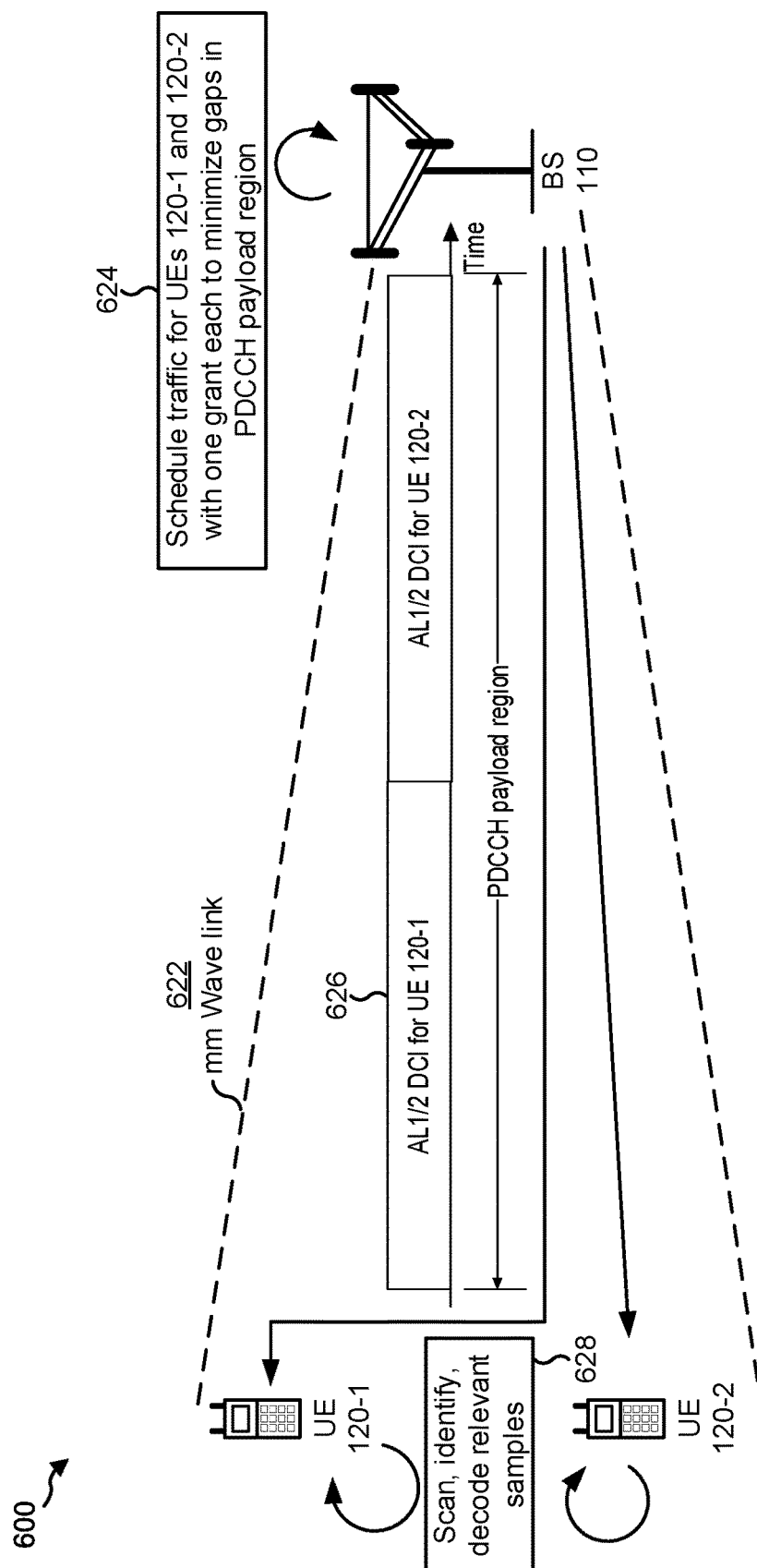

As shown in FIG. 6C, and by reference number 622, in some aspects, the BS 110 may cover two UEs (e.g., UEs 120-1 and 120-2). In such a case, and as shown by reference number 624, the BS 110 may determine to schedule downlink traffic for the UEs 120-1 and 120-2 with one grant for each UE 120 to minimize gaps in the PDCCH payload region.

As shown by reference number 626, the BS 110 may provide a DCI for UE 120-1 on a first portion of the PDCCH payload region, and may provide a DCI for UE 120-2 on a second portion of the PDCCH payload region. Thus, the BS 110 may provide DCIs for two UEs 120 on a single PDCCH payload region using a highest possible aggregation level, which may reduce gaps and PAPR of the downlink signal and improve single-carrier performance of the system. In such a case, hashing may be used to reduce blocking between the UE 120-1 and 120-2 when grants for the UE 120-1 and 120-2 are included in a single coreset or PDCCH payload region. For example, the grants (e.g., DCIs, etc.) may be encoded based at least in part on a respective seed associated with the UEs 120-1 and 120-2.

As shown by reference number 628, the respective UEs 120 may scan the PDCCH payload region, may identify the respective relevant samples at the AL1/2 aggregation level, and may decode the respective relevant samples to obtain the respective DCIs. In some aspects, the respective UEs 120 may each scan a candidate sample at the AL1 aggregation level, then may scan candidate samples at the AL1/2 aggregation level to identify relevant samples. Additionally, or alternatively, the respective UEs 120 may be configured to first scan at the AL1/2 level (e.g., based at least in part on RRC signaling between the BS 110 and the respective UEs 120). The respective UEs 120 may decode the relevant samples to obtain the respective DCIs.

Figure 6D:
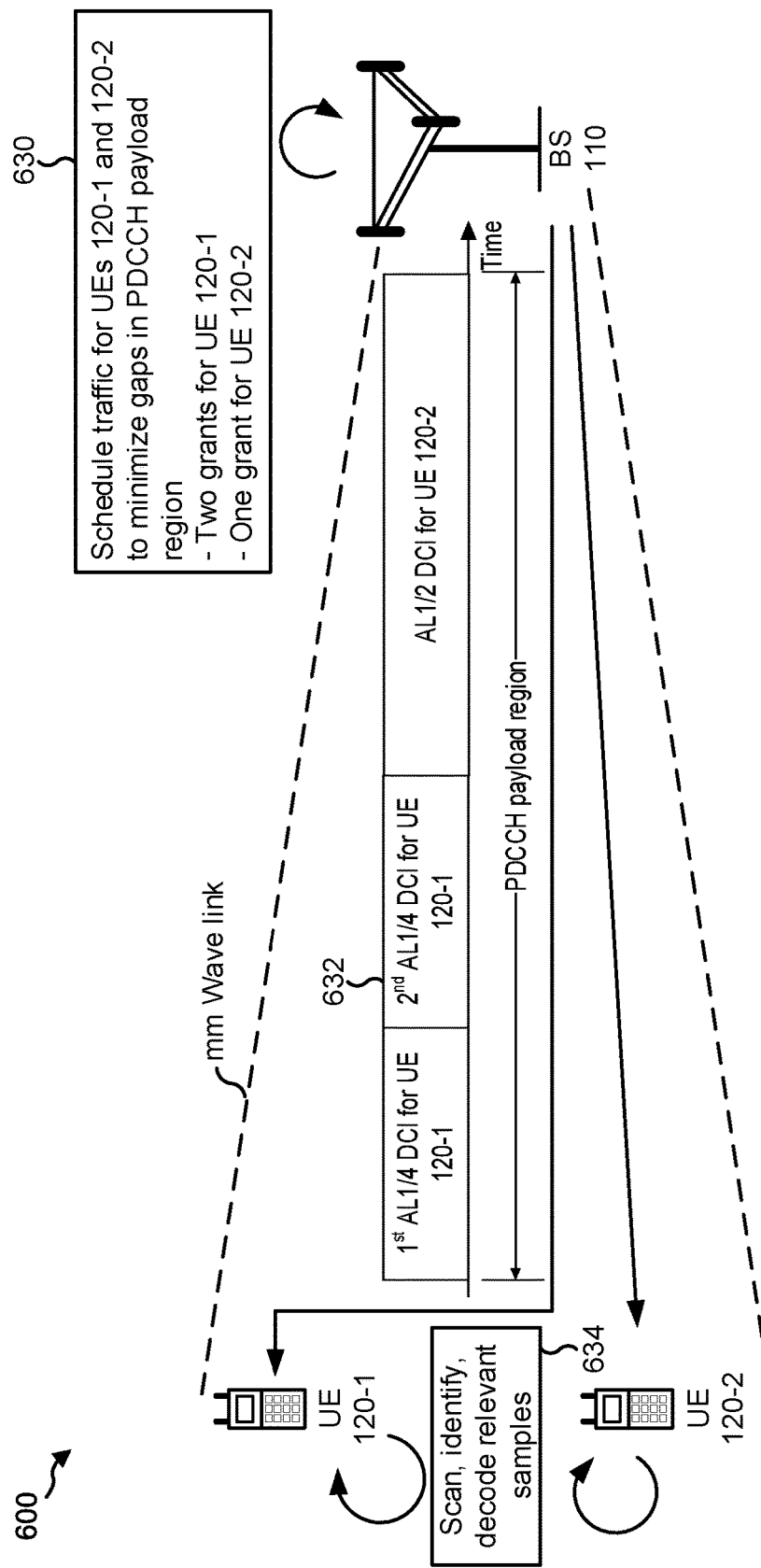

FIG. 6D shows an example of providing DCIs for two grants to a UE 120-1 and a single DCI for a grant to a UE 120-2. As shown in FIG. 6D, and by reference number 630, the BS 110 may determine to schedule traffic for the UEs 120-1 and 120-2 to minimize gaps in the PDCCH payload region (e.g., for the two grants associated with the UE 120-1 and the single grant associated with UE 120-2).

As shown by reference number 632, the BS 110 may provide the PDCCH payload region to the UEs 120-1 and 120-2. As further shown, the PDCCH payload region may include first and second portions corresponding to the UE 120-1, and a third portion corresponding to the UE 120-2. As shown, the first and second portions may be associated with an aggregation level of AL1/4, and the third portion may be associated with an aggregation level of AL1/2. In this way, the BS 110 may provide two grants to one UE 120, and a single grant to another UE 120, using a single PDCCH payload region. Further, the BS 110 may select highest possible ALs for the respective DCIs, which reduces or eliminates gaps in the PDCCH payload region, even when multiple UEs 120 are associated with the PDCCH payload region.

As shown by reference number 634, the UEs 120-1 and 120-2 may scan the PDCCH payload region, may identify the respective relevant samples at the AL1/2 level and the AL1/4 level, and may decode the respective relevant samples to obtain the respective DCI for the UEs 120-1 and 120-2. In some aspects, the UEs 120-1 and 120-2 may start scanning at the AL1 aggregation level, and may proceed to scan at lower aggregation levels until the respective relevant samples are identified. Additionally, or alternatively, the UEs 120-1 and 120-2 may start scanning at the AL1/2 and/or the AL1/4 aggregation level (e.g., based at least in part on configuration of the UEs 120-1 and 120-2) which may conserve resources that would be used to start scanning at the highest possible aggregation level.

As indicated above, FIGS. 6A-6D are provided as examples. Other examples are possible and may differ from what was described with respect to FIGS. 6A-6D.

FIG. 7 is a flow chart of a method 700 of wireless communication. The method may be performed by a UE (e.g., the UE 120 of FIG. 1, the apparatus 802/802', and/or the like).

At 710, the UE may receive a control channel that includes a plurality of candidate samples having at least two aggregation levels. For example, the UE 120 may receive a control channel, such as a PDCCH. The control channel may include a plurality of candidate samples, such as a plurality of regions of different sizes that may include DCI relevant to the UE. The plurality of regions may have at least two aggregation levels, such as a highest aggregation level spanning an entirety of the control channel and one or more other aggregation levels that are subsets of the control channel.

At 720, the UE may scan a set of candidate samples, of the plurality of candidate samples, to identify a relevant sample. In some aspects, the scanning is performed on the set of candidate samples in an order from a higher aggregation level of the at least two aggregation levels to a lower aggregation level of the at least two aggregation levels. For example, the UE may scan a set of candidate samples using a top-to-bottom scanning approach. In some aspects, the UE may scan the set of candidate samples starting at the highest aggregation level. In some aspects, the UE may start at a lower aggregation level (i.e., lower than the highest aggregation level).

At 730, the UE may scan for two or more relevant samples. For example, in such a case, each relevant sample, of the two or more relevant samples, may be associated with a respective grant.

At 740, the UE may decode the relevant sample. For example, the UE may decode the relevant sample based at least in part on a hash or seed associated with the UE.

Method 700 may include additional aspects, such as any single aspect or any combination of aspects described below.

In some aspects, a candidate sample associated with a highest aggregation level includes an entirety of the control channel. In some aspects, a candidate sample of the higher aggregation level includes multiple, different candidate samples of the lower aggregation level. In some aspects, at least two candidate samples of a particular aggregation level include different quantities of resource elements. In some aspects, the control channel is associated with a plurality of aggregation levels including the at least two aggregation levels, and the at least two aggregation levels do not include a highest aggregation level of the plurality of aggregation levels. In some aspects, the UE is configured to scan for two or more relevant samples, wherein each relevant sample, of the two or more relevant samples, is associated with a respective grant. In some aspects, the UE is a first UE, and the control channel includes a candidate sample that is relevant to a second UE. In some aspects, the candidate sample that is relevant to the second UE has a different aggregation level than the relevant sample. In some aspects, the control channel further includes hashing information to reduce blocking between the first UE and the second UE.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
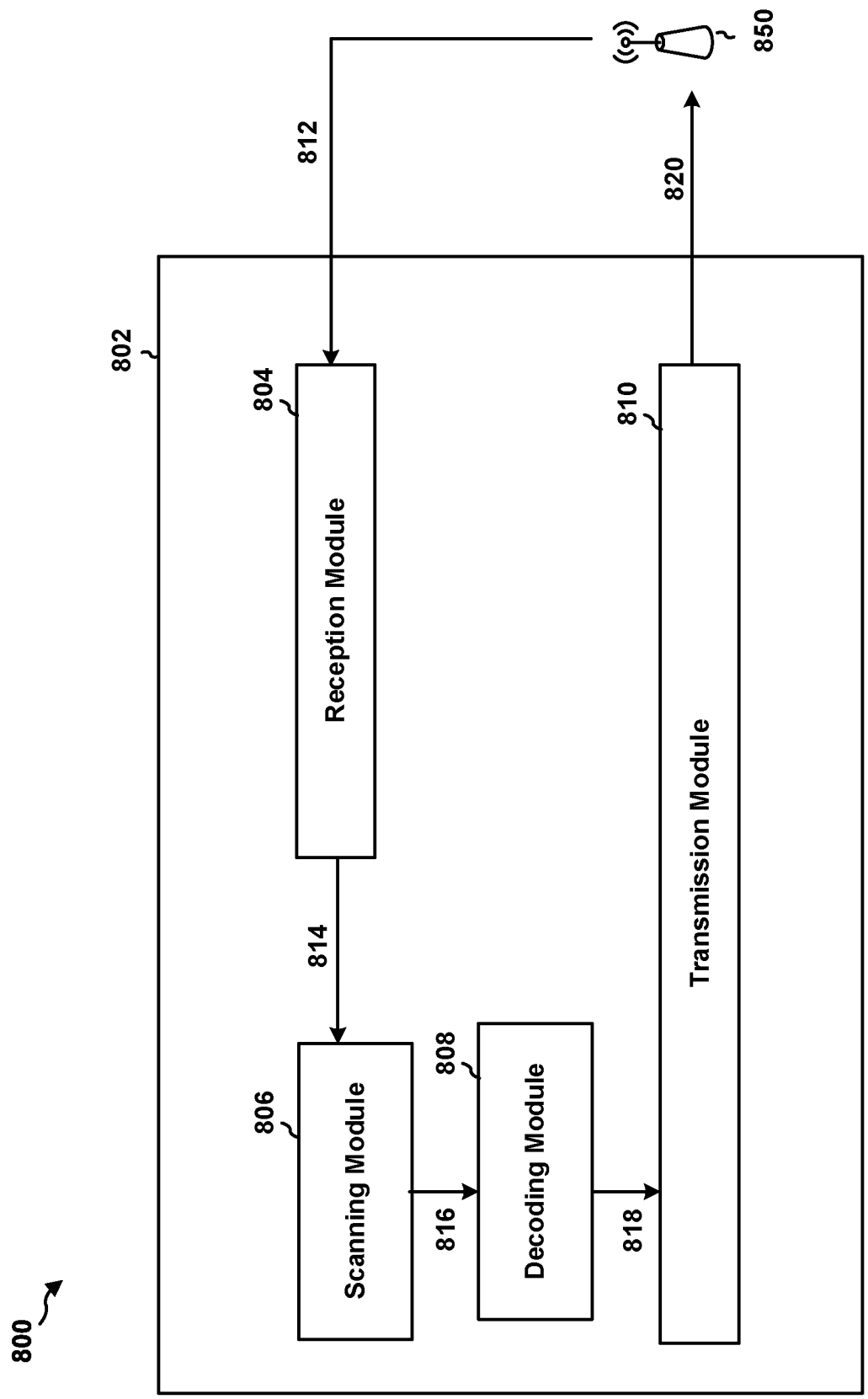
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE (e.g., the UE 120 of FIG. 1). In some aspects, the apparatus 802 includes a reception module 804, a scanning module 806, a decoding module 808, and/or a transmission module 810.

The reception module 804 may receive data 812 from a base station 850 (e.g., the BS 110 and/or the like). The data 812 may include a control channel, such as a PDCCH. The reception module may provide the data 812 to the scanning module 806 as data 814.

The scanning module 806 may scan candidate samples of the control channel to identify a relevant sample associated with the apparatus 802. For example, the scanning module 806 may scan or search using a top-to-bottom approach. The scanning module may provide data 816 identifying the relevant sample to the decoding module 808.

The decoding module 808 may decode the relevant sample. For example, the decoding module 808 may decode the relevant sample to obtain a downlink grant, a DCI, and/or the like. In some aspects, the decoding module 808 may provide data 818 to the reception module 804 and/or the transmission module 810 identifying the downlink grant, DCI, and/or the like. The reception module 804 or transmission module 810 may receive data 812 or transmit data 820 based at least in part on the data 818.

The apparatus may include additional modules that perform each of the blocks of the algorithm in the aforementioned flow chart of FIG. 7. As such, each block in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
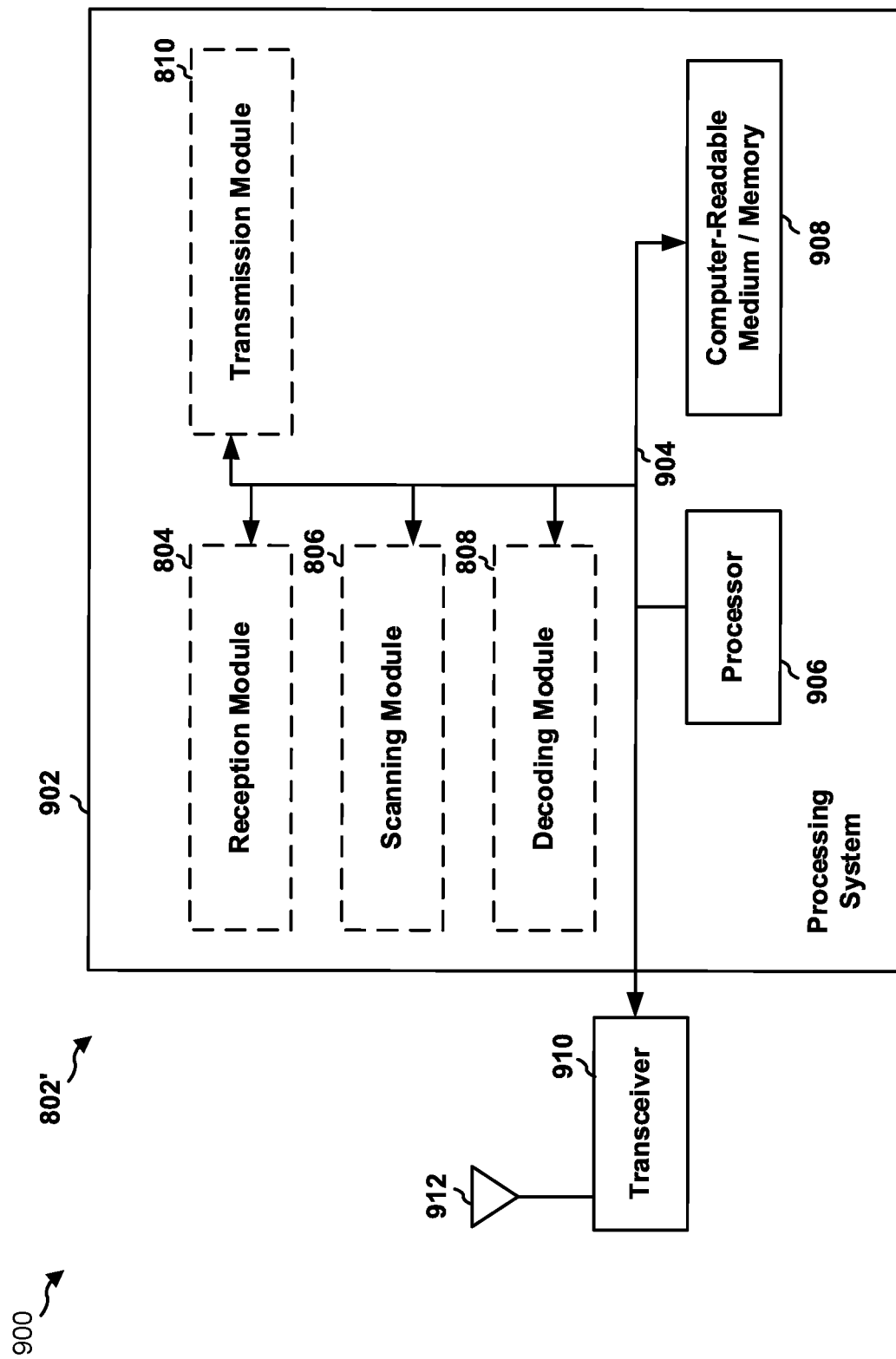
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE (e.g., the UE 120).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, 810. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280. In some aspects, the processing system 902 may be a component of the BS 110 and may include the memory 242 and/or at least one of the TX MIMO processor 230, the receive processor 238, and/or the controller/processor 240.

In some aspects, the apparatus 802/802' for wireless communication includes means for receiving a control channel that includes a plurality of candidate samples having at least two aggregation levels; means for scanning a set of candidate samples, of the plurality of candidate samples, to identify a relevant sample associated with the apparatus 802/802', wherein the scanning is performed on the set of candidate samples in an order from a higher aggregation level of the at least two aggregation levels to a lower aggregation level of the at least two aggregation levels; and/or means for decoding the relevant sample. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

Additionally, or alternatively, the aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 9 is provided as an example. Other examples are possible and may differ from what was described in connection with FIG. 9.

Figure 10:
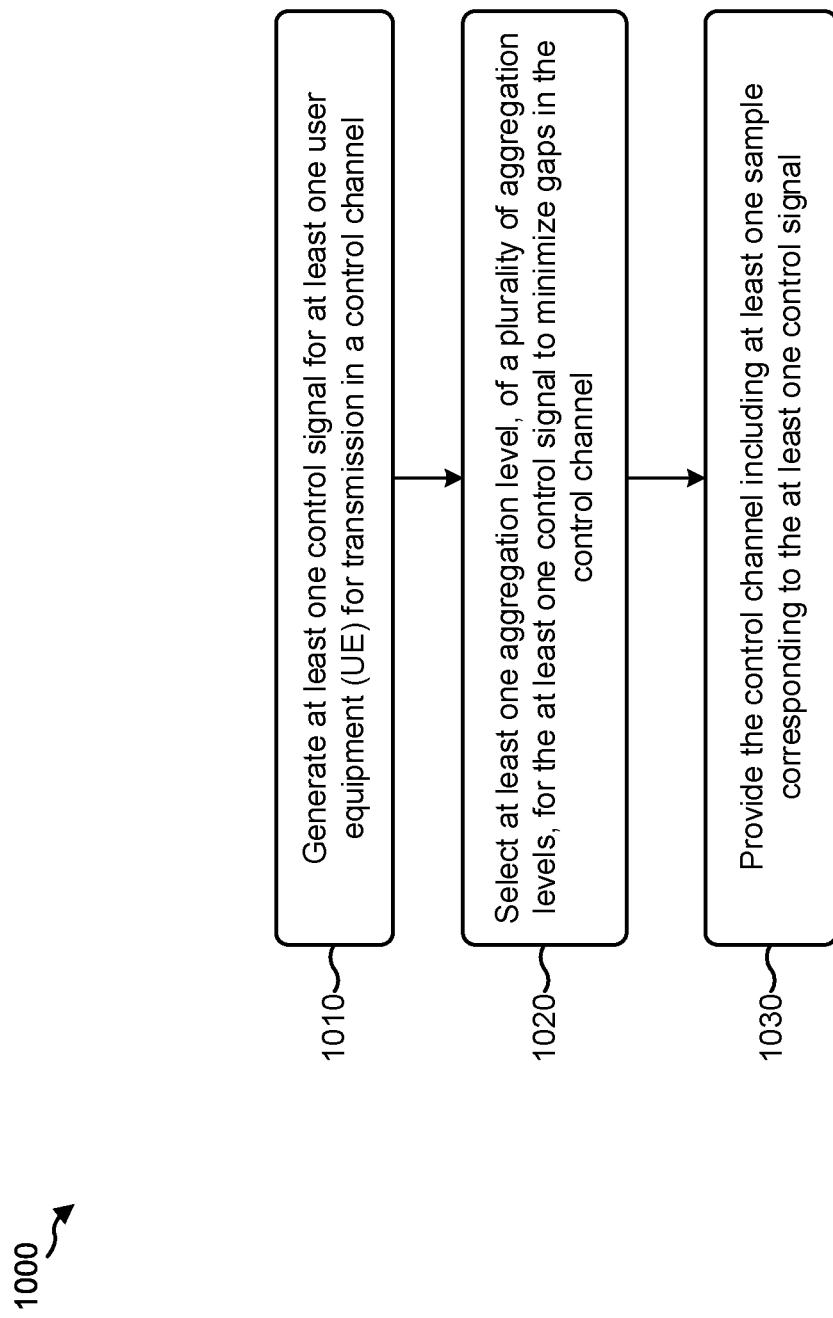
FIG. 10 is a flow chart of a method of wireless communication.

FIG. 10 is a flow chart of a method 1000 of wireless communication. The method may be performed by a base station (e.g., the BS 110 of FIG. 1, the apparatus 1102/1102', and/or the like).

At 1010, the BS may generate at least one control signal for at least one UE for transmission in a control channel. For example, the BS may identify the at least one UE based at least in part on the BS covering the at least one UE, based at least in part on the BS being a scheduling entity for the at least one UE, based at least in part on the BS having a mmWave link with the at least one UE, and/or the like.

In some aspects, the control channel is associated with a plurality of aggregation levels, and a highest aggregation level, of the plurality of aggregation levels, spans an entirety of the control channel. For example, the BS may generate a control channel (e.g., a PDCCH) to provide the control signal. The control channel may be associated with a plurality of aggregation levels. A highest aggregation level, of the plurality of aggregation levels, may span an entirety of the control channel.

At 1020, the BS may select at least one aggregation level, of a plurality of aggregation levels, for the at least one control signal to minimize gaps in the control channel. For example, the BS may select at least one aggregation level for the at least one control signal. The BS may select the at least one aggregation level to minimize gaps in the control channel. For example, the BS may select a highest aggregation level that spans the entire control channel when the at least one UE includes a single UE. Additionally, or alternatively, the BS may select a same aggregation level for two or more different control signals to minimize the gaps, or may select different aggregation levels for two or more different control signals to minimize the gaps.

At 1030, the BS may provide the control channel including at least one sample corresponding to the at least one control signal. For example, the BS may provide the control channel to the at least one UE. The control channel may include at least one sample corresponding to the at least one control signal, and the at least one UE may search the control channel to identify relevant samples that are relevant to the at least one UE.

Method 1000 may include additional aspects, such as any single aspect or any combination of aspects described below.

In some aspects, a highest aggregation level, of the plurality of aggregation levels, spans an entirety of the control channel. In some aspects, a particular UE of the at least one UE is configured to receive a plurality of control signals, and the base station is configured to provide a plurality of control signals associated with the at least one aggregation level as part of the control channel. In some aspects, the at least one control signal includes at least one scheduling grant. In some aspects, the at least one control signal includes a plurality of control signals, and wherein at least two control signals, of the plurality of control signals, are associated with different aggregation levels. In some aspects, a sample of a higher aggregation level, of the plurality of aggregation levels, includes multiple, different samples of a lower aggregation level of the plurality of aggregation levels. In some aspects, at least two candidate samples of a same aggregation level include different quantities of resource elements.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
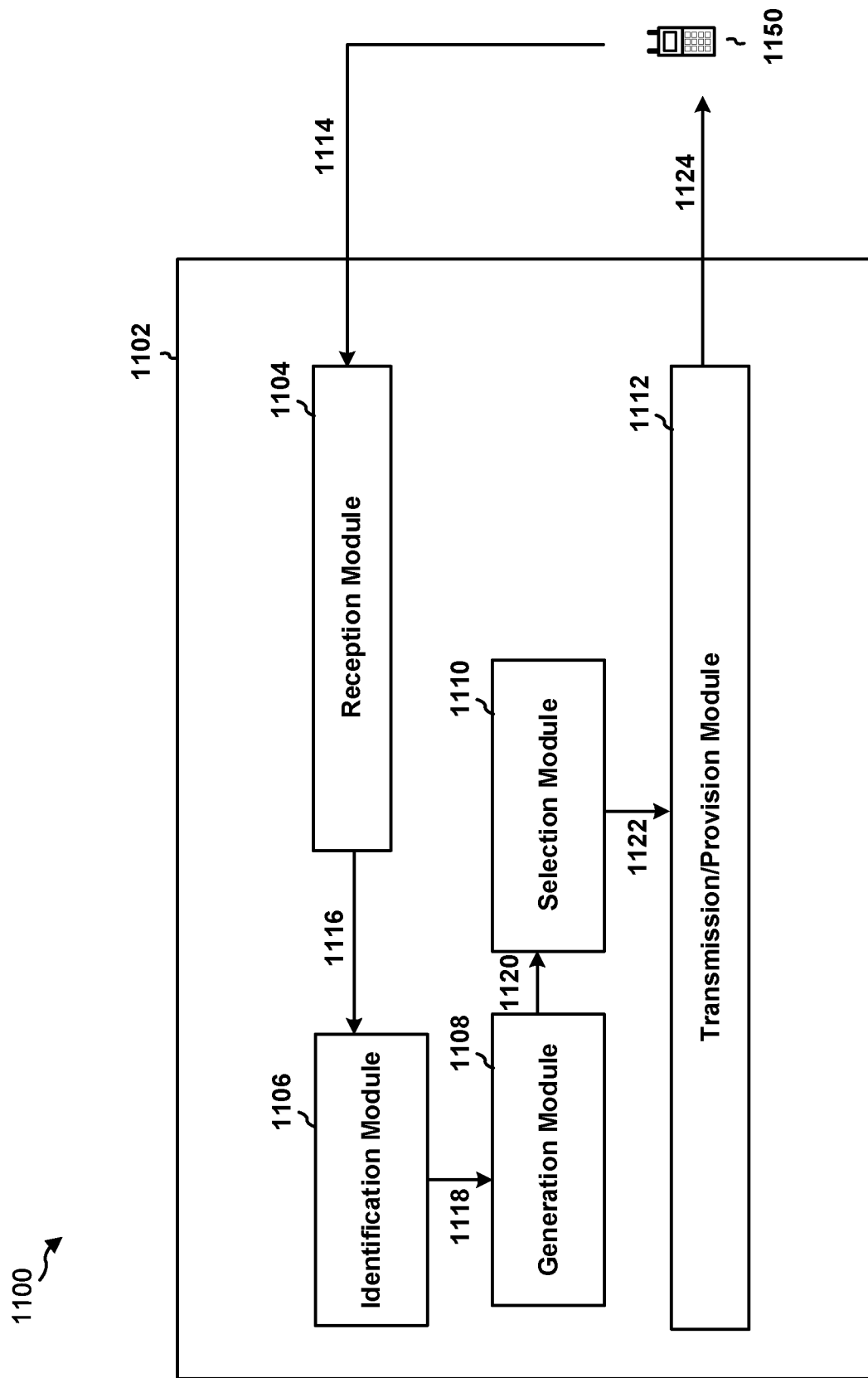
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be an eNB (e.g., the BS 110). In some aspects, the apparatus 1102 includes a reception module 1104, an identification module 1106, a generation module 1108, a selection module 1110, and/or a transmission/provision module 1112.

The reception module 1104 may receive or determine data 1114 that is to be provided to a UE 1150 (e.g., a UE 120 and/or the like), and may provide an indication of the data 1114 to the identification module 1106 as data 1116. Based at least in part on the data 1114, the identification module 1106 may identify the UE 1150 to receive at least one control signal. The at least one control signal may include DCI based at least in part on the data 1114. The identification module 1106 may provide information 1118 to the generation module 1108 indicating that the scheduling grant is to be provided to the UE 1150.

The generation module 1108 may generate the at least one control signal for the UE 1150 for transmission in a control channel (e.g., a PDCCH). The generation module 1108 may provide data 1120 to the selection module 1110 identifying the at least one control signal. The selection module 1110 may select at least one aggregation level, of a plurality of aggregation levels, for the at least one control signal to minimize gaps in the control channel. The selection module 1110 may provide data 1122 to the transmission/provision module 1112 identifying the control channel, as configured based at least in part on the at least one aggregation level. The transmission/provision module 1112 may provide the control channel to the UE 1150 as signals 1124.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example.

In practice, there may be additional modules, fewer modules, different modules, or differently arranged modules than those shown in FIG. 11. Furthermore, two or more modules shown in FIG. 1 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
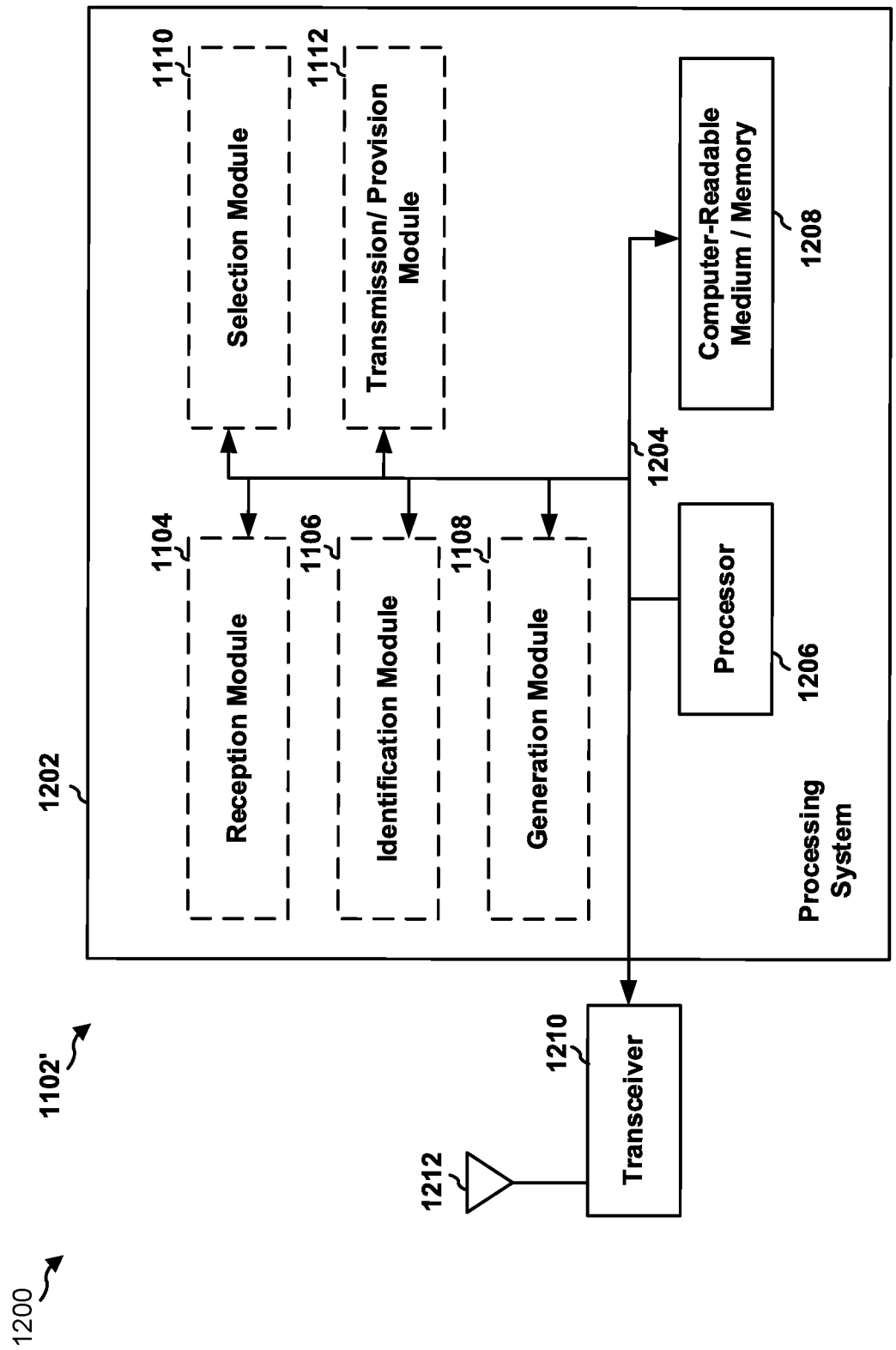
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be an eNB (e.g., the BS 110 and/or the like).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, 1112, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission/provision module 1112, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, 1110. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, the receive processor 238, and/or the controller/processor 240. In some aspects, the processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for generating at least one control signal for at least one user equipment (UE) for transmission in a control channel, wherein the control channel is associated with a plurality of aggregation levels; means for selecting at least one aggregation level, of the plurality of aggregation levels, for the at least one control signal to minimize gaps in the control channel; and/or means for providing the control channel including at least one sample corresponding to the at least one control signal. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

Additionally, or alternatively, the aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   generating, by a base station, at least one control signal for at least one user equipment (UE) for transmission in a control channel, wherein the control channel is associated with a plurality of aggregation levels, and wherein a highest aggregation level, of the plurality of aggregation levels, spans an entirety of the control channel;
   selecting, by the base station, at least one aggregation level, of the plurality of aggregation levels, for the at least one control signal; and
   providing, by the base station, the control channel including at least one sample corresponding to the at least one control signal.

2. The method of claim 1, wherein providing the control channel comprises providing a plurality of control signals associated with the at least one aggregation level as part of the control channel.

3. The method of claim 1, wherein the at least one control signal includes at least one scheduling grant.

4. The method of claim 1, wherein the at least one control signal includes a plurality of control signals.

5. The method of claim 4, wherein at least two control signals, of the plurality of control signals, are associated with different aggregation levels.

6. The method of claim 1, wherein a sample of a first aggregation level, of the plurality of aggregation levels, includes multiple, different samples of a second aggregation level of the plurality of aggregation levels.

7. The method of claim 1, wherein at least two samples of a same aggregation level include different quantities of resource elements.

8. A base station for wireless communication, comprising:
   a memory; and
   one or more processors coupled to the memory, the memory and the one or more processors configured to:
      generate at least one control signal for at least one user equipment (UE) for transmission in a control channel, wherein the control channel is associated with a plurality of aggregation levels, and wherein a highest aggregation level, of the plurality of aggregation levels, spans an entirety of the control channel;

select at least one aggregation level, of the plurality of aggregation levels, for the at least one control signal; and provide the control channel including at least one sample corresponding to the at least one control signal.

9. The base station of claim 8, wherein the memory and the one or more processors, to provide the control channel, are configured to provide a plurality of control signals associated with the at least one aggregation level as part of the control channel.

10. The base station of claim 8, wherein the at least one control signal includes at least one scheduling grant.

11. The base station of claim 8, wherein a sample of a first aggregation level, of the plurality of aggregation levels, includes multiple, different samples of a second aggregation level of the plurality of aggregation levels.

12. The base station of claim 8, wherein the at least one control signal includes a plurality of control signals.

13. The base station of claim 12, wherein at least two control signals, of the plurality of control signals, are associated with different aggregation levels.

14. The base station of claim 8, wherein at least two samples of a same aggregation level include different quantities of resource elements.

15. A non-transitory computer-readable medium storing one or more instructions for wireless communication, the one or more instructions comprising:

one or more instructions that, when executed by one or more processors of a base station, cause the one or more processors to:

generate at least one control signal for at least one user equipment (UE) for transmission in a control channel, wherein the control channel is associated with a plurality of aggregation levels, and wherein a highest aggregation level, of the plurality of aggregation levels, spans an entirety of the control channel;

select at least one aggregation level, of the plurality of aggregation levels, for the at least one control signal; and provide the control channel including at least one sample corresponding to the at least one control signal.

16. The non-transitory computer-readable medium of claim 15, wherein the one or more instructions to provide the control channel comprise one or more instructions to provide a plurality of control signals associated with the at least one aggregation level as part of the control channel.

17. The non-transitory computer-readable medium of claim 15, wherein the at least one control signal includes at least one scheduling grant.

18. The non-transitory computer-readable medium of claim 15, wherein a sample of a first aggregation level, of the plurality of aggregation levels, includes multiple, different samples of a second aggregation level of the plurality of aggregation levels.

19. The non-transitory computer-readable medium of claim 18, wherein the first aggregation level is higher among the plurality of aggregation levels than the second aggregation level.

20. The non-transitory computer-readable medium of claim 15, wherein the at least one control signal includes a plurality of control signals.

21. The non-transitory computer-readable medium of claim 20, wherein at least two control signals, of the plurality of control signals, are associated with different aggregation levels.

22. The non-transitory computer-readable medium of claim 15, wherein at least two samples of a same aggregation level include different quantities of resource elements.

23. The method of claim 6, wherein the first aggregation level is higher among the plurality of aggregation levels than the second aggregation level.

24. The base station of claim 11, wherein the first aggregation level is higher among the plurality of aggregation levels than the second aggregation level.

25. An apparatus for wireless communication, comprising:

means for generating at least one control signal for at least one user equipment (UE) for transmission in a control channel, wherein the control channel is associated with a plurality of aggregation levels, and wherein a highest aggregation level, of the plurality of aggregation levels, spans an entirety of the control channel;

means for selecting at least one aggregation level, of the plurality of aggregation levels, for the at least one control signal; and means for providing the control channel including at least one sample corresponding to the at least one control signal.

26. The apparatus of claim 25, wherein the means for providing the control channel comprises means for providing a plurality of control signals associated with the at least one aggregation level as part of the control channel.

27. The apparatus of claim 25, wherein the at least one control signal includes at least one scheduling grant.

28. The apparatus of claim 25, wherein the at least one control signal includes a plurality of control signals.

29. The apparatus of claim 28, wherein at least two control signals, of the plurality of control signals, are associated with different aggregation levels.

30. The apparatus of claim 25, wherein a sample of a first aggregation level, of the plurality of aggregation levels, includes multiple, different samples of a second aggregation level of the plurality of aggregation levels.

31. The apparatus of claim 30, wherein the first aggregation level is higher among the plurality of aggregation levels than the second aggregation level.

32. The apparatus of claim 25, wherein at least two samples of a same aggregation level include different quantities of resource elements.

* * * * *